(«12») United States Patent
Tsuji et al.

(10) Patent No.: US 8,199,832 B2
(45) Date of Patent: Jun. 12, 2012

(54) VIDEO-SIGNAL SWITCHING APPARATUS

(75) Inventors: Tomohiro Tsuji, Fujimino (JP); Satoshi Miyaji, Fujimino (JP)

(73) Assignee: KDDI R & D Laboratories Inc., Saitama (JP)

( * ) Notice: Subject to any disclaimer, the term of this patent is extended or adjusted under 35 U.S.C. 154(b) by 479 days.

(21) Appl. No.: 12/411,706

(22) Filed: Mar. 26, 2009

(65) Prior Publication Data

US 2009/0244392 A1 Oct. 1, 2009

(30) Foreign Application Priority Data

Mar. 28, 2008 (JP) ................................. 2008-088033

(51) Int. Cl.
*H04N 7/12* (2006.01)
*H04N 11/02* (2006.01)

(52) U.S. Cl. ............................... 375/240.26; 375/240.27

(58) Field of Classification Search . 375/240.01–240.29
See application file for complete search history.

(56) References Cited

U.S. PATENT DOCUMENTS 6,025,878 A * 2/2000 Boyce et al. ............. 375/240.16
6,104,441 A * 8/2000 Wee et al. ................. 375/240.15
6,611,624 B1 * 8/2003 Zhang et al. .................. 382/232
6,831,949 B1 * 12/2004 Brightwell et al. ...... 375/240.12
7,096,481 B1 * 8/2006 Forecast et al. ................. 725/32

FOREIGN PATENT DOCUMENTS

JP 2006-287444 10/2006

* cited by examiner

*Primary Examiner* — David Czekaj
(74) *Attorney, Agent, or Firm* — Westman, Champlin & Kelly, P.A.

(57) ABSTRACT

A first buffer analyzer receives attribute information (a) of a video signal (A) from a stream buffer (A) to determine an encoded picture type after correction and a generated encoding amount after correction for a switch terminating measure. A second buffer analyzer receives attribute information (b) of a video signal (B) and final buffer-state information after the switch terminating measure from a stream buffer (B) to determine an encoded picture type after correction and a generated encoding amount after correction for a switch starting measure. A re-encoder/re-quantizer (A) and a re-encoder/re-quantizer (B) perform the switch terminating measure and the switch starting measure on the video signals (A) and (B), respectively, based on the correction information from the first and second buffer analyzers.

7 Claims, 6 Drawing Sheets

VIDEO-SIGNAL SWITCHING APPARATUS

The present application claims priority of Japanese patent application Serial No. 2008-088033, filed Mar. 28, 2008, the content of which is hereby incorporated by reference in its entirety.

BACKGROUND OF THE INVENTION

1. Field of the Invention

The present invention relates to a video-signal switching apparatus, and more particularly, relates to a video-signal switching apparatus capable of switching two video signals at high speed.

2. Description of the Related Art

Figure 12:
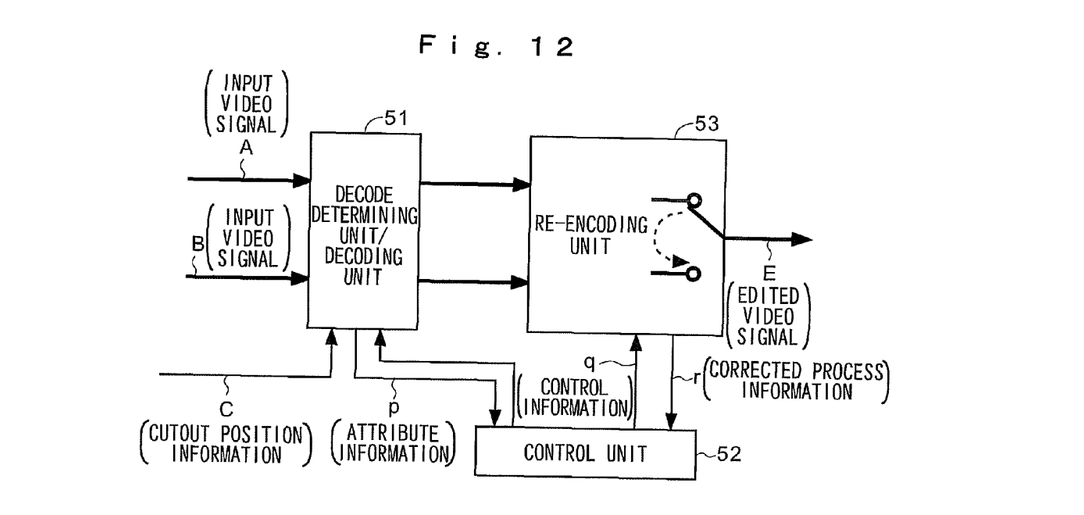
FIG. 12 is an explanatory block diagram of one example of the conventional video-information editing apparatus.

As one example of the conventional video-signal switching apparatus, for example, there is disclosed that which is mentioned in Patent Document 1. As shown in FIG. 12, a video-information editing apparatus mentioned in Patent Document 1 is composed of a decode determining unit/decoding unit 51, a control unit 52, and a re-encoding unit 53. The decode determining unit/decoding unit 51 is input video signals (A) and (B) to be edited and cutout position information (C). Then, the decode determining unit/decoding unit 51 decodes the cutout position and a picture (frame) near that position, and transmits attribute information (p), such as a picture mode, a bit amount, a quantization parameter, to a control unit 52. Upon receipt of the attribute information (p), the control unit 52 evaluates a correlation value of pictures at the cutout positions of the video signals (A) and (B). When the correlation value is equal to or more than a threshold value, the control unit 52 determines to encode the picture at the cutout position of the video signal (B) as an inter-picture that is the same as the picture at the cutout position of the video signal (A). On the other hand, when the correlation value is smaller than the threshold value, the control unit 52 determines to encode the picture at the cutout position of the video signal (B) as an intra-picture. Further, the control unit 52 determines whether it is possible to maintain a predetermined quality in relation to a bit amount of encoding when the re-encoding is performed by the determined encoding mode, and in response to the determination result, the control unit 52 analyzes to correct a picture type and an encoding amount of a plurality of frames before and after the cutout position of the video signals (A) and (B). Then, the control unit 52 outputs control information (q) (picture mode, quantization parameter, etc.) about each frame to be reconstructed, etc., to the re-encoding unit 53. The re-encoding unit 53 edits to switch between the video signals (A) and (B) based on the control information (q), and informs the control unit 52 of corrected process information (r) (virtual buffer occupation amount information, a bit amount, etc.). In this way, from the re-encoding unit 53, an edited video signal (E) is output.

According to the above-described conventional technology, it is possible to provide an effect in which an image quality degradation can be inhibited while suppressing an increase in the bit amount that occurs concurrently with re-encoding.

Patent Document 1: Japanese Published Unexamined Patent Application No. 2006-287444

However, in the above-described conventional technology, the video signal (B) succeeding to the cutout position is input, and thereafter, the control unit 52 evaluates the correlation value of the pictures at the cutout positions of the video signals (A) and (B). Based on the correlation value, a policy for re-encoding a plurality of frames before and after the cutout position is established, and in this state, the actual re-encoding is performed. Thus, there is a problem that a great delay between inputting and outputting of the video signal occurs.

SUMMARY OF THE INVENTION

An object of the present invention is to provide a video-signal switching apparatus in which a delay between inputting and outputting of two switched video signals is reduced.

In order to achieve the object, the present invention is characterized in that a video-signal switching apparatus, to which two video signals, video signals (A) and (B), are input, and from which the video signal switched from the video signal (A) to (B) at an arbitrary time is output, comprises an input stream buffer for temporarily accumulating the video signals (A) and (B), a first buffer analyzer for determining an encoded picture type after correction and a generated encoding amount after correction for a switch terminating measure, based on attribute information of a video signal acquired from a stream buffer of the video signal (A) before and after the switching, a second buffer analyzer for determining an encoded picture type after correction and a generated encoding amount after correction for a switch starting measure, based on attribute information of a video signal acquired from a stream buffer of the video signal (B) before and after the switching and final buffer-state information after the switch terminating measure obtained from the first buffer analyzer, a first video signal correcting processor for performing an information-amount correcting process of the video signal (A) by the encoded picture type and generated encoding amount after correction determined by the first buffer analyzer so as to output buffer-transition information after correction, a second video signal correcting processor for performing an information-amount correcting process of the video signal (B), by the encoded picture type and generated encoding amount after correction determined by the second buffer analyzer, and a switch for switching from the video signal (A) produced in the first video signal correcting processor to the video signal (B) produced in the second video signal correcting processor.

According to the present invention, the first buffer analyzer and the second buffer analyzer independently determine an encoded picture type after correction for a switch terminating measure, and an encoded picture type after correction for a switch starting measure. As a result, the first and second buffer analyzers do not need to calculate the correlation of two video signals before and after the switching point of the encoded picture at the switching point. Thus, it becomes possible to reduce a delay between inputting and outputting of the two switched video signals.

Also, because of this, switching from the first video signal to the second video signal can be performed rapidly and smoothly.

DETAILED DESCRIPTION OF THE PREFERRED EMBODIMENTS

Figure 1:
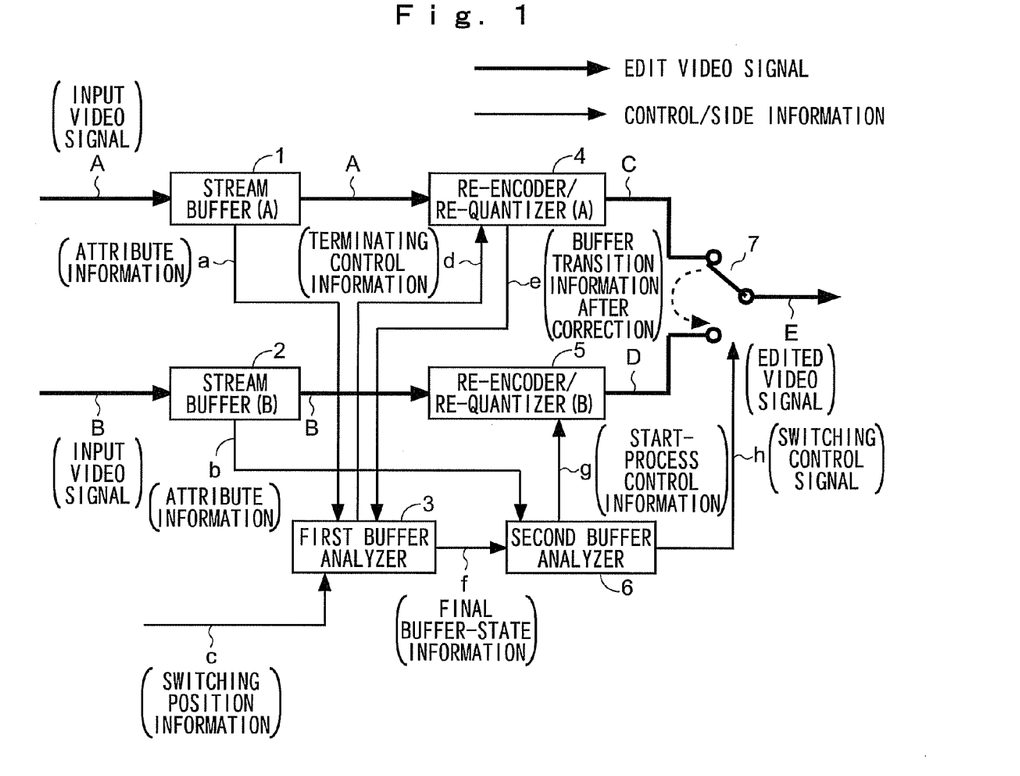
FIG. 1 is a block diagram showing a schematic configuration of one embodiment of the present invention.

With reference to the drawings, the present invention will be described in detail, below. FIG. 1 is a block diagram showing a schematic configuration of one embodiment of a video-signal switching apparatus of the present invention. In FIG. 1, there is described a case that an input video signal is encoded by a compression-encoding system using an inter-frame prediction, represented by MPEG, in which an input video signal (A) is switched to an input video signal (B) at an arbitrary switching position. However, this invention is not always the case. That is, for the input video signals (A) and (B) in FIG. 1, an MPEG-2 video (ISO/IEC13818-2) is used as an example. However, even if another compression-encoding system such as MPEG-4AVC (ISO/IEC14496-10) is used, the present invention can be similarly applicable. It is noted that the bold line in FIG. 1 indicates a flow of a video signal and the thin line indicates flows of control information and side information.

The video signals (A) and (B) are input to stream buffers (A)1 and (B)2, respectively. A first buffer analyzer 3 is input switching position information (c). Then, the first buffer analyzer 3 determines a terminating process method of a video signal at a switching point based on attribute information (a) of the video signal (A) acquired from the stream buffer (A)1. Herein, the attribute information (a) is a video buffer size, video-buffer-amount transition information, and encoded-type information of each video frame, associated with the input video signal (A). In an MPEG-2 video signal, each of these pieces of information corresponds to the following information (i) to (iii) written in ISO/IEC13818-2:

(i) Video Buffer Size

This video buffer size is "vbv_buffer_size" calculated from 10-bit "vbv_buffer_size_value" written in "sequence_header ( )" and 8-bit "vbv_buffer_size_extension" written in "sequence_extension ( )."

(ii) Video-Buffer-Amount Transition Information

Figure 2:
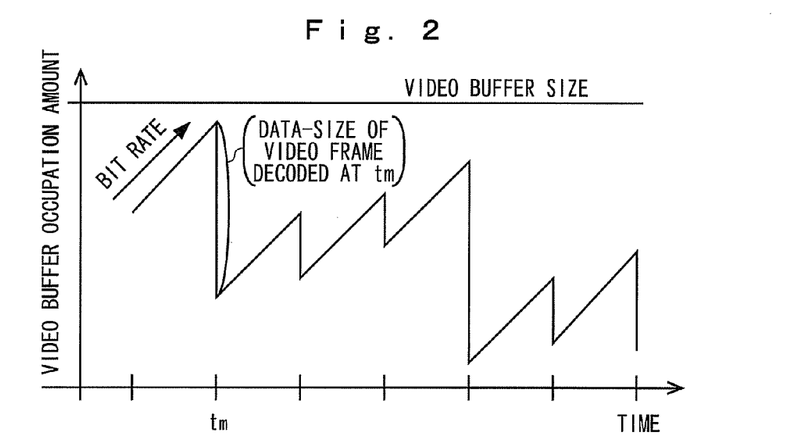
FIG. 2 is a diagram showing one example of a transition of a video buffer amount.

This video-buffer-amount transition information is information of a time shift of a video-buffer occupation amount shown in a transition diagram of a video-buffer occupation amount regulated in Annex C. One example of the transition diagram is shown in FIG. 2.

(iii) Encoded-Picture-Type Information of Video Frame

This encoded-picture-type information is an encoded type specified from "picture_coding_type" written in "picture_header ( )."

The terminating process method of the video signal in the first buffer analyzer 3 can be determined by the following two processes, as one example.

(1) A change process of a timewise position and a spatial position of a referencing destination, for avoiding wrong referencing.

(2) An adjusting process of a generated bit amount, for avoiding a video buffer failure of the switched stream.

Subsequently, a specific example as described above in (1) "replacing process of a picture type for avoiding wrong referencing," is described below.

Figure 3:
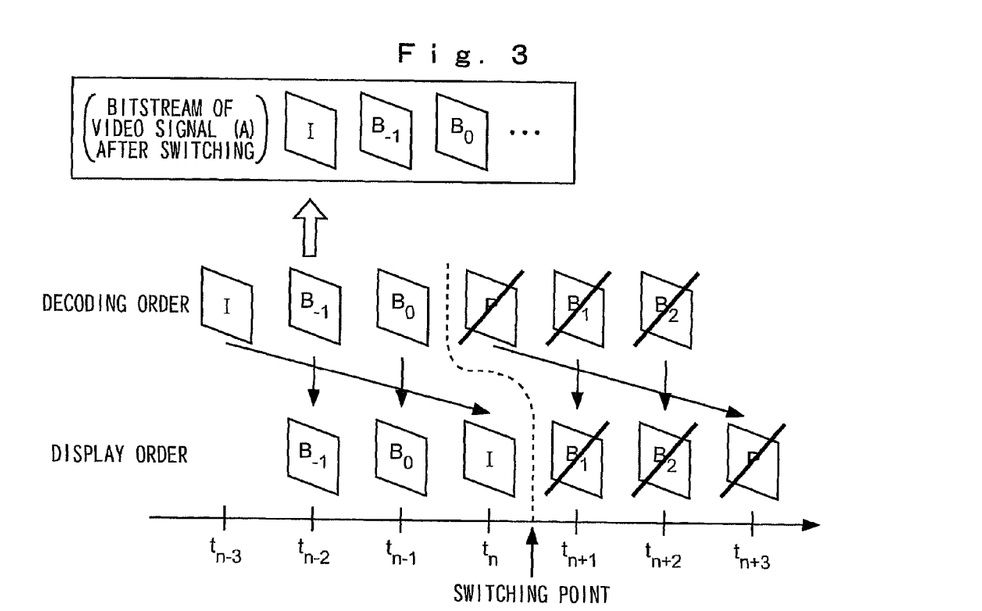
FIG. 3 is a diagram showing a first example of determining an encoded picture type after correction for a switch terminating measure.

(1a) When a switching point of the input video signal (A) is an I (intra-) picture or a P picture:

As shown in FIG. 3, when the switching point of the input video signal (A) is the I or P picture in the display order, bit stream data lined according to the decoding order is severed immediately after $B_0$. It is noted that the P or B picture indicates an inter-picture, and a subscript assigned to the B picture indicates a timewise order of the B picture. Hereinafter, the same applies.

Figure 4:
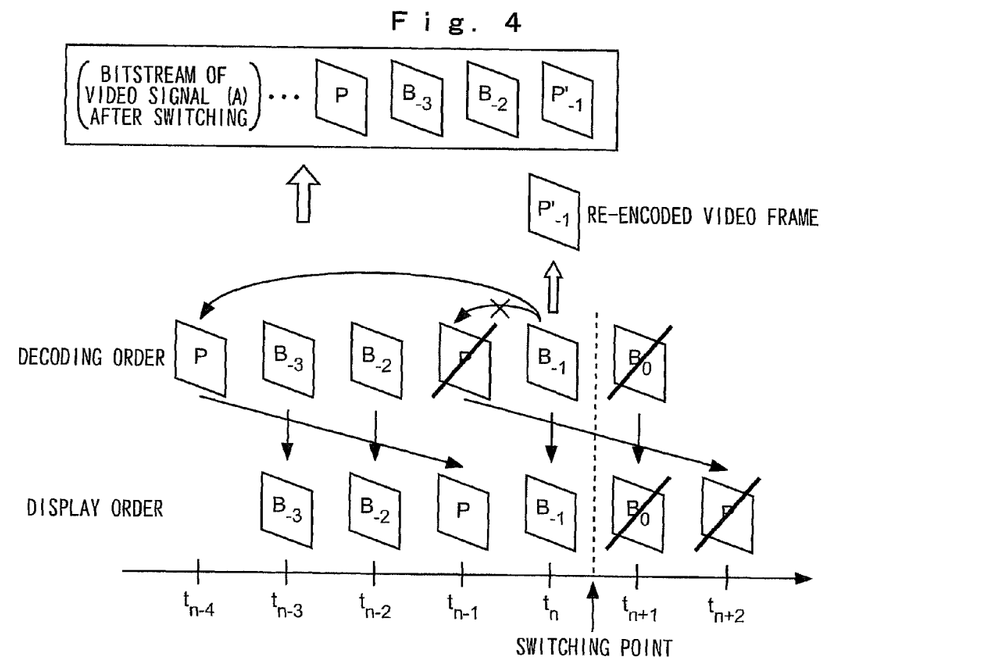
FIG. 4 is a diagram showing a second example of determining an encoded picture type after correction for a switch terminating measure.

(1b) When the switching point of the input video signal (A) is the B picture:

As shown in FIG. 4, when the switching point of the input video signal (A) is $B_{-1}$ in the display order, $B_{-1}$ is decoded, and thereafter, re-encoded by the P picture. Re-encoded $B_{-1}$ is indicated as ($P'_{-1}$).

Figure 5:
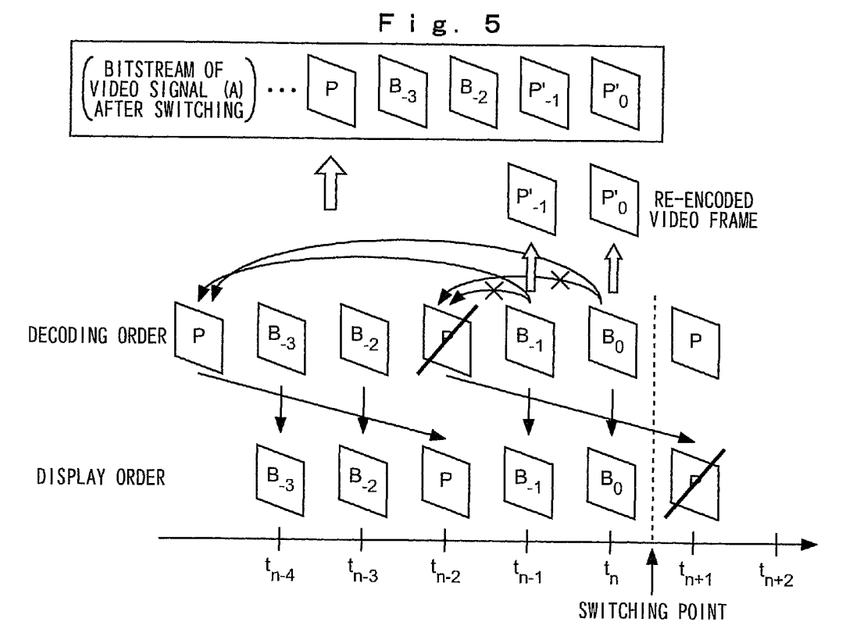
FIG. 5 is a diagram showing a third example of determining an encoded picture type after correction for a switch terminating measure.

Also, as shown in FIG. 5, when the switching point of the input video signal (A) is $B_0$ in the display order, $B_{-1}$ and $B_0$ are decoded, and thereafter, re-encoded by the P picture. Re-encoded $B_{-1}$ and $B_0$ are as $P'_{-1}$ and $P'_0$, respectively.

Further, when the data size of a video frame is changed by the processes in FIG. 3 to FIG. 5, an overflow or an underflow may be generated in the buffer transition as described in FIG. 2. Therefore, as described above in (2) "adjusting process of a generated bit amount, for avoiding a video buffer failure of the switched stream" is performed. That is, various processes are performed: a data amount after re-encoding is limited so that the buffer does not fail at the time of the processes in FIG. 3 to FIG. 5, or the data amount is adjusted so that the buffer does not fail by a re-quantizing process described later after the processes in FIG. 3 to FIG. 5. In this way, the stream after the terminating measure can be brought into agreement with the regulations of ISO/IEC13818-2 Annex C.

Now, referring again to FIG. 1, a first video signal correction processor, for example, re-encoder/re-quantizer (A)4, receives from the first buffer analyzer 3, terminating-measure control information (d) composed of: switching information of re-encoding/re-quantizing, which are picture types at a switching point of the input video signal (A) determined as described in FIG. 3 to FIG. 5 and near adjacent before that point; and corrected-buffer amount information, which is a generated bit amount for avoiding the video buffer failure of the switched stream, so as to correct the picture type and the bit rate of the input video signal (A).

One specific example of the re-encoder/re-quantizer (A)4 is described with reference to FIG. 6. The re-encoder/re-quantizer (A)4 is composed of a variable-length decoding unit 41, a target-quantization-parameter converting unit 42, a re-quantizing unit 43, and a re-encoding unit 44.

The variable-length decoding unit 41 is input the input video signal (A) in frame units. Each frame of the input video signal A is prediction-encoded in microblock (MB) units. The variable-length decoding unit 41 decodes the variable length of the input video signal A so as to extract a quantization parameter QP, a quantized DCT coefficient COEF, MB information indicating a prediction encoding mode of MB, MV information indicating a motion vector for each MB, and various types of header information (a sequence layer, a GOP layer, a picture layer, and a slice layer).

The target-quantization-parameter converting unit 42 converts the quantization parameter QP extracted by the variable-length decoding unit 41 based on the corrected-buffer amount information (d1) into a target value (target quantization parameter) QPt of the quantization parameter after bit-rate conversion, by a known method. The target value QPt is input to the re-quantizing unit 43 and the re-encoding unit 44, and serves as a target value both for re-quantization in the re-quantizing unit 43 and for quantization in the re-encoding unit 44. Subsequently, the re-quantizing unit 43 and the re-encoding unit 44 are selected by the switching information (d2) of the re-encoding/re-quantizing. The selected re-quantizing unit 43 or the re-encoding unit 44 is input the quantization parameter QP, the quantized DCT coefficient COEF, the MB information indicating the prediction encoding mode of MB, the MV information indicating a motion vector for each MB, and the various types of header information from the variable-length decoding unit 41.

The re-quantizing unit 43 and the re-encoding unit 44 delete a frame and correct a frame interval thereby to make it possible to correct the information amount (bit rate). In this way, from the re-encoder/re-quantizer (A)4 in FIG. 1, the video signal (C) that has undergone the terminating measure is output. It is noted that although not shown, when the switching process is not generated, the input video signal (A) is output as it is as a video signal (E). For one specific example of the re-quantizing unit 43 and the re-encoding unit 44, those which are shown in FIG. 2 and FIG. 3 of Japanese Published Unexamined Patent Application No. 2007-135101 may be used, for example.

The result of the terminating measure of the re-encoder/re-quantizer (A)4 is fed back to the first buffer analyzer 3, as the buffer transition information after correction (e), and also, input to the second buffer analyzer 6 from the first analyzer 3, as final buffer-state information (f).

The second buffer analyzer 6 acquires from the stream buffer (B)2 the same attribute information (b) as the attribute information (a), i.e., a video buffer size, a video-buffer-amount transition information, and encoded-picture-type information of each video frame associated with the input video signal B. Then, a starting process of the input video signal (B) is performed. A specific example of the starting process of the picture type is described below.

Figure 7:
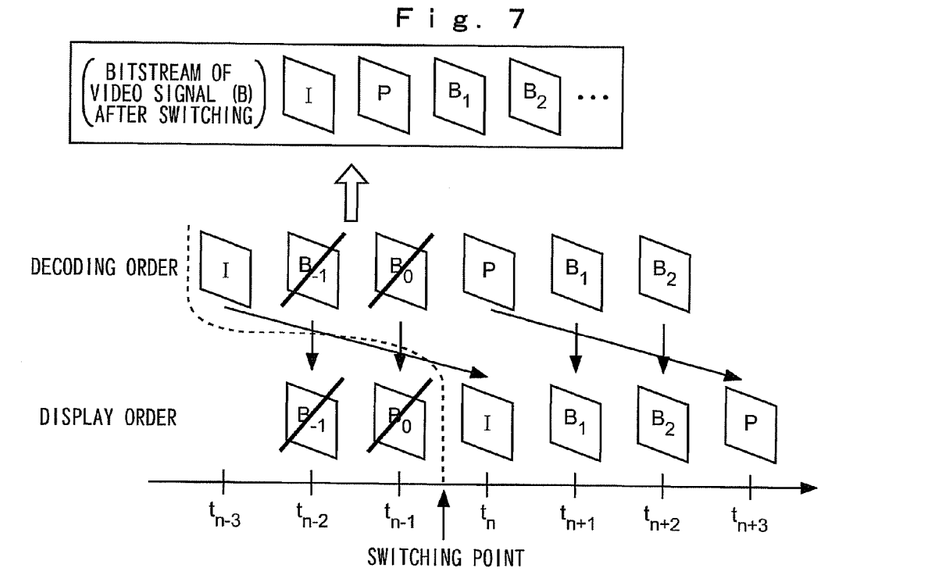
FIG. 7 is a diagram showing a first example of determining an encoded picture type after correction for a switch starting process.

(2a) When the switching point of the input video signal (B) is an I picture:

As shown in FIG. 7, when the switching point of the input video signal B is the I picture in the display order and when the B picture appearing immediately after the I picture does not reference the I or P picture before the I picture, $B_{-1}$ and $B_0$ are deleted.

Figure 8:
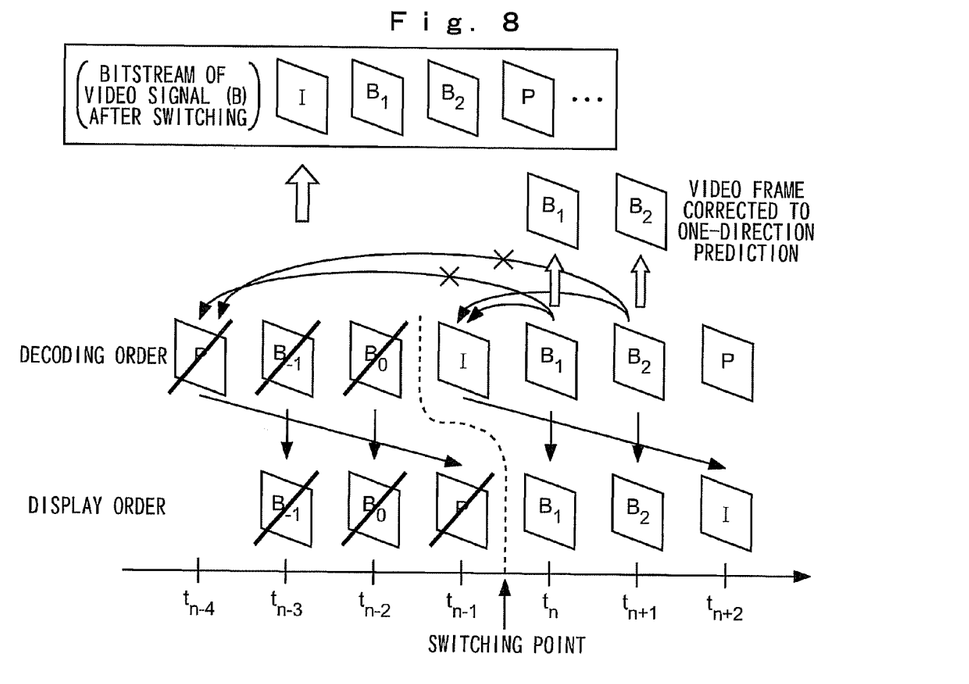
FIG. 8 is a diagram showing a second example of determining an encoded picture type after correction for a switch starting process.

(2b) When the B picture appearing immediately after the I picture references the I or P picture before the I picture:

As shown in FIG. 8, there is performed a correction such that a prediction of the B picture that references a frame within the immediately preceding GOP is eliminated. That is, $B_1$ and $B_2$ pictures are corrected to a one-direction prediction.

Figure 9:
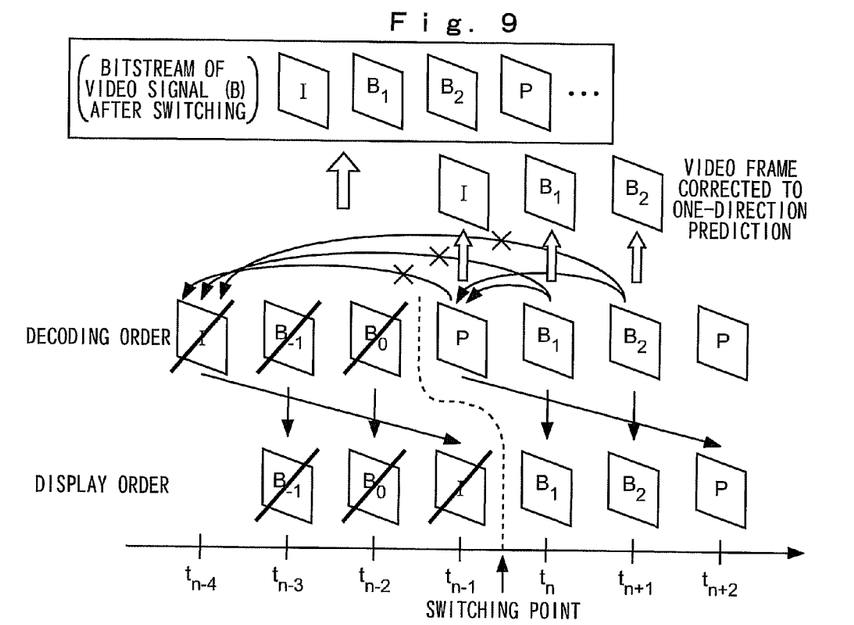
FIG. 9 is a diagram showing a third example of determining an encoded picture type after correction for a switch starting process.
Figure 10:
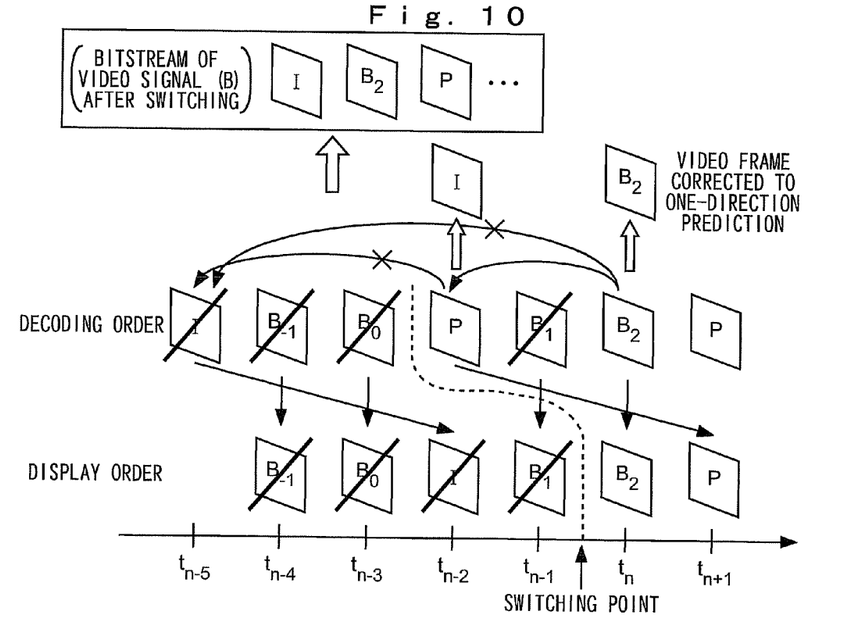
FIG. 10 is a diagram showing a fourth example of determining an encoded picture type after correction for a switch starting process.

(2c) When the switching point of the input video signal (B) is the B picture:

As shown in FIG. 9 and FIG. 10, when the switching point of the input video signal (B) is the B picture in the display order, in the former, the P picture is changed to the I picture, and also, $B_1$ and $B_2$ pictures are corrected to the one-direction prediction while in the latter, the P picture is changed to the I picture, the $B_1$ picture is deleted, and the $B_2$ picture is corrected to the one-direction prediction.

Figure 11:
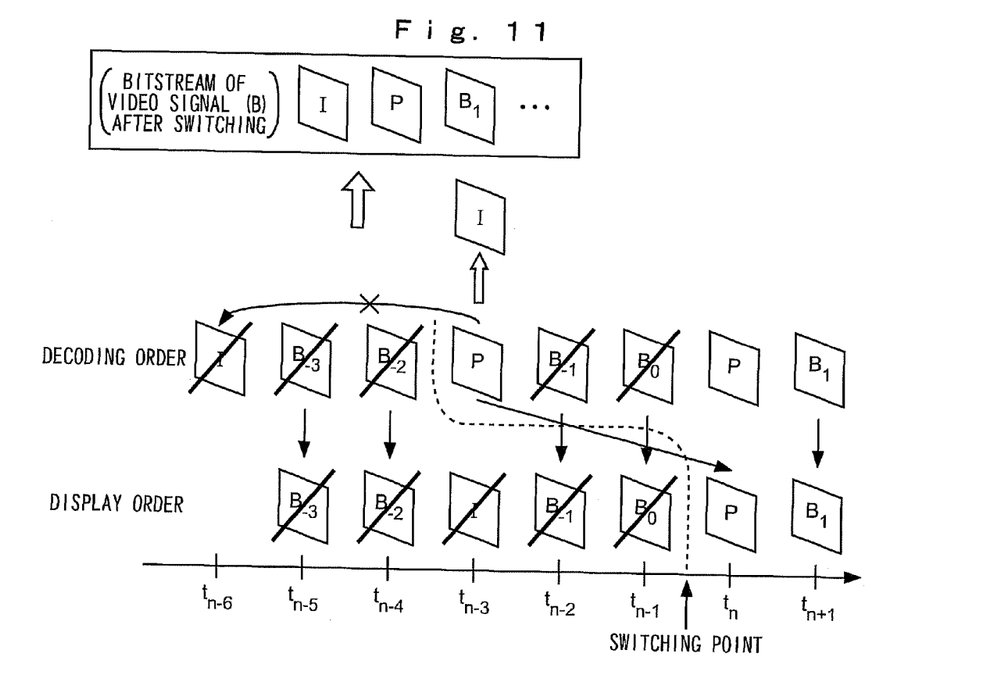
FIG. 11 is a diagram showing a fifth example of determining an encoded picture type after correction for a switch starting process.

(2d) When the switching point of the input video signal B is the P picture:

As shown in FIG. 11, when the switching point of the input video signal B is the P picture in the display order, the P picture is changed to the I picture, and also the $B_1$ and $B_0$ pictures are deleted.

The second buffer analyzer 6 further performs an adjusting process of the generated bit amount, for avoiding a video buffer failure of the switched stream, similar to the first buffer analyzer 3. The second buffer analyzer 6 informs a second video signal correction processor, for example, a re-encoder/re-quantizer (B)5, of start-process control information (g) composed of the switching information of the re-encoding/re-quantizing and the corrected-buffer amount information.

Figure 6:
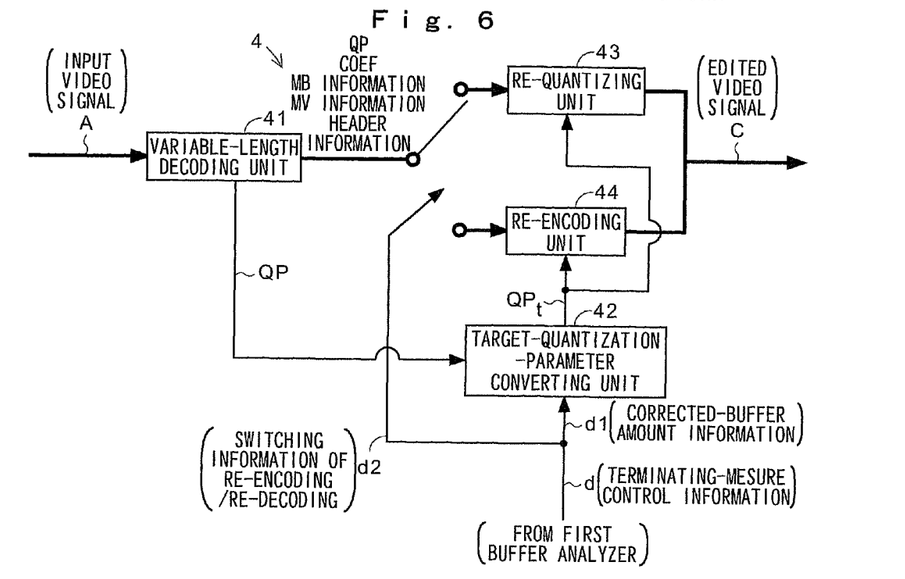
FIG. 6 is a block diagram showing one specific example of re-encoders/re-quantizers (A) and (B).

The configuration and the operation of the re-encoder/re-quantizer (B)5 are the same as those of the re-encoder/re-quantizer (A)4, and one specific example thereof has been described in FIG. 6. Therefore, from the re-encoder/re-quantizer (B)5, a video signal D that has undergone the starting measure is output.

A switching control signal (h) of a switch 7 for switching the video signals (C) and (D) can be output from the second buffer analyzer 6 capable of confirming whether the output of the video signal C after the terminating measure is completed. Alternatively, the switching control signal (h) maybe output from the re-encoder/re-quantizer (A)4 or the first buffer analyzer 3. It is noted that an edit video signal (E) that has been switched from the video signal (A) to the video signal (B) can hold a timewise continuity of the output timing of the video signal (E) by adjusting the output timing by the buffer amount of the stream buffers (A)1 and (B)2 or a buffering amount of a buffer (not shown) newly arranged between the re-encoder/re-quantizer and the switch 7.

According to the present invention, the determinations of the encoded picture type after correction for a switch terminating measure and the encoded picture type after correction for a switch starting process can be independently performed by the first buffer analyzer and the second buffer analyzer, and the information received by the second buffer analyzer from the first buffer analyzer is the final buffer-state information only. Thus, according to the present invention, unlike in the conventional technology, there is no need for reconstructing the GOP structure by evaluating a correlation value of the pictures at cutout positions of the video signals (A) and (B), and the delay between inputting and outputting of the two switched video signals can be reduced.

What is claimed is:

1. A video-signal switching apparatus, to which two video signals, video signals (A) and (B), are input, and from which the video signal switched from the video signal (A) to (B) at an arbitrary time is output, the video-signal switching apparatus, comprising:

input stream buffers for temporarily accumulating the video signals (A) and (B);

a first buffer analyzer for determining an encoded picture type after correction and a generated encoding amount after correction for a switch terminating measure, based on attribute information of a video signal acquired from a stream buffer of the video signal (A) before and after the switching;

a second buffer analyzer for determining an encoded picture type after correction and a generated encoding amount after correction for a switch starting measure, based on attribute information of a video signal acquired from a stream buffer of the video signal (B) before and after the switching and final buffer-state information after the switch terminating measure obtained from the first buffer analyzer;

a first video signal correcting processor for performing an information-amount correcting process of the video signal (A) by the encoded picture type and generated encoding amount after correction determined by the first buffer analyzer so as to output buffer-transition information after correction;

a second video signal correcting processor for performing an information-amount correcting process of the video signal (B), by the encoded picture type and generated encoding amount after correction determined by the second buffer analyzer; and a switch for switching from the video signal (A) produced in the first video signal correcting processor to the video signal (B) produced in the second video signal correcting processor.

2. The video-signal switching apparatus according to claim 1, wherein the video signals (A) and (B) are video signals compressed according to an encoding system such as an MPEG.

3. The video-signal switching apparatus according to claim 1, wherein in the correction of the generated encoding amount, an information amount of each frame is corrected.

4. The video-signal switching apparatus according to claim 1, wherein in the correction of the generated encoding amount, a frame is deleted or a frame interval is corrected.

5. The video-signal switching apparatus according to claim 1, wherein the attribute information of the video signal includes a video buffer size, video-buffer-amount transition information, and encoded-picture-type information of a video frame, acquired from the video signal.

6. The video-signal switching apparatus according to claim 1, wherein the first and second buffer analyzers determine a correcting sequence of the encoded picture type and a correcting amount of the generated encoding amount, based on the attribute information of the video signal.

7. The video-signal switching apparatus according to claim 1, wherein the first and second video signal correcting processors are first and second re-encoders/re-quantizers, respectively.

* * * * *